United States Patent
Berry et al.

(10) Patent No.: US 12,455,212 B2
(45) Date of Patent: Oct. 28, 2025

(54) PROXIMITY PROBE PISTON POSITIONING SYSTEMS

(71) Applicant: Hamilton Sundstrand Corporation, Charlotte, NC (US)

(72) Inventors: Erin E. Berry, Roscoe, IL (US); Donna Laboda, Roscoe, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 237 days.

(21) Appl. No.: 18/137,839

(22) Filed: Apr. 21, 2023

(65) Prior Publication Data

US 2024/0230468 A1    Jul. 11, 2024

Related U.S. Application Data

(63) Continuation-in-part of application No. 18/096,003, filed on Jan. 11, 2023, now abandoned.

(51) Int. Cl.
*G01M 15/06* (2006.01)
*F02D 41/00* (2006.01)

(52) U.S. Cl.
CPC .......... *G01M 15/06* (2013.01); *F02D 41/009* (2013.01)

(58) Field of Classification Search
CPC .............. G01M 15/06; F02D 41/009; F05D 2250/292; G01D 5/202; G01D 2205/18; G01D 2205/24; F16K 31/124; F16K 37/0041; F02C 7/232
See application file for complete search history.

(56) References Cited

U.S. PATENT DOCUMENTS

| | | | |
|---|---|---|---|
| 4,717,874 A * | 1/1988 | Ichikawa | F15B 15/2846 324/207.16 |
| 4,768,420 A | 9/1988 | Korthaus | |
| 7,318,292 B2 | 1/2008 | Helbling et al. | |
| 2010/0200785 A1* | 8/2010 | Goto | F15B 13/0442 251/65 |
| 2011/0023982 A1 | 2/2011 | Griffiths | |
| 2012/0042657 A1* | 2/2012 | Hodinot | F02C 7/232 60/734 |
| 2015/0330373 A1 | 11/2015 | Lindner et al. | |
| 2017/0292628 A1 | 10/2017 | Dolenti | |

FOREIGN PATENT DOCUMENTS

| | | | |
|---|---|---|---|
| DE | 102008062301 A1 | 6/2009 | |
| EP | 0170723 A2 | 2/1986 | |
| GB | 2299676 A * | 10/1996 | G01B 7/003 |

OTHER PUBLICATIONS

Extended European Search Report for EP Application No. 24151469.4, Dated May 31, 2024, pp. 6.

* cited by examiner

*Primary Examiner* — Peter J Macchiarolo
*Assistant Examiner* — Timothy P Graves
(74) *Attorney, Agent, or Firm* — Kinney & Lange, P.A.

(57) ABSTRACT

A piston assembly includes a housing, a piston positioned within the valve housing, and an inductive proximity probe sensor positioned on the housing configured to detect a position of the piston with the housing. The piston is configured to at least one of rotate or translate axially relative to the housing. The piston includes a variable surface. A fuel control system includes the piston assembly, a servo valve in fluid communication with the piston assembly, and an engine controller. The engine controller is operatively connected to the inductive proximity probe sensor.

13 Claims, 2 Drawing Sheets

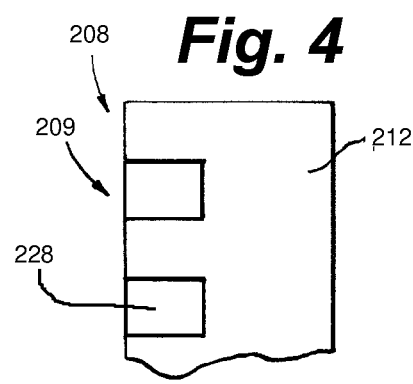

PROXIMITY PROBE PISTON POSITIONING SYSTEMS

CROSS-REFERENCE TO RELATED APPLICATIONS

This non-provisional patent application is a continuation-in-part of, and claims benefit of and priority to, U.S. application Ser. No. 18/096,003 filed on Jan. 11, 2023, the contents of which are incorporated by reference in their entirety.

BACKGROUND OF THE INVENTION

1. Field of the Invention

The present disclosure relates to positioning systems, and more particularly to positioning systems for pistons in one or more aircraft systems.

2. Description of Related Art

Fuel systems on an aircraft may include multiple valves for allowing fuel supply to or from the aircraft's main fuel tanks, and/or to control and/or maintain pressure. Proper control of the fuel system is based on the consistent operation of the valves within the fuel system. For actively controlled valves, accurate and consistent feedback is needed for consistent valve operation. Without consistent valve operation, the fuel system may become unpredictable. One aspect of effectively controlling valves is knowing the position of a piston of a given valve. This position is often measured by a Linear Variable Differential Transformer (LVDT).

The conventional techniques have been considered satisfactory for their intended purpose. However, there is a need for alternate systems and methods for determining piston position. This disclosure provides a solution for this need.

SUMMARY

A piston assembly includes a housing, a piston positioned within the valve housing, and an inductive proximity probe sensor positioned on the housing configured to detect a position of the piston with the housing. The piston is configured to at least one of rotate or translate axially relative to the housing. The piston includes a variable surface.

In accordance with some embodiments, the piston includes a piston base and a piston stem. In certain embodiments, the variable surface can be a tapered surface on the piston stem. The tapered surface can be a surface at an angle relative to a longitudinal axis of the piston. The tapered surface can converge away from the piston base. The piston base can be cylindrical. The piston stem can be a converging cylindrical cone that converges away from the piston base.

In certain embodiments, the variable surface is a notched surface including a plurality of notches. The plurality of notches can be formed in an axial direction relative to the piston. In some embodiments, the plurality of notches are formed circumferentially about the piston. In some embodiments, the plurality of notches are formed on the piston stem. In some embodiments, the variable surface is a multi-material surface. The multi-material surface can include a first base material having a plurality of notches. At least one of the plurality of notches can be filled with a second non-ferrous material.

The assembly can include a working fluid chamber positioned between a first side of a piston base and the housing. The assembly can include a control pressure chamber positioned between a second side of the piston base and the housing.

In accordance with another aspect, a fuel control system includes a piston assembly, a servo valve in fluid communication with the piston assembly, and an engine controller. The piston assembly has a housing, a piston positioned within the housing, and an inductive proximity probe sensor positioned on the housing configured to detect a position of the piston with the housing. The piston is configured to rotate and/or translate axially relative to the housing. The piston includes a variable surface. The engine controller is operatively connected to the inductive proximity probe sensor.

The piston assembly can be similar to that described above. The piston assembly can include a working fluid chamber positioned between a first side of the piston base and the housing. The servo valve can be in fluid communication with the working fluid chamber.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is an enlarged schematic depiction the notched piston stem of the embodiment of the piston assembly of FIG. 2A, showing the notches having a non-magnetic material embedded into the notches so the piston stem has a smooth outer surface.

DETAILED DESCRIPTION OF THE PREFERRED EMBODIMENTS

Figure 1:
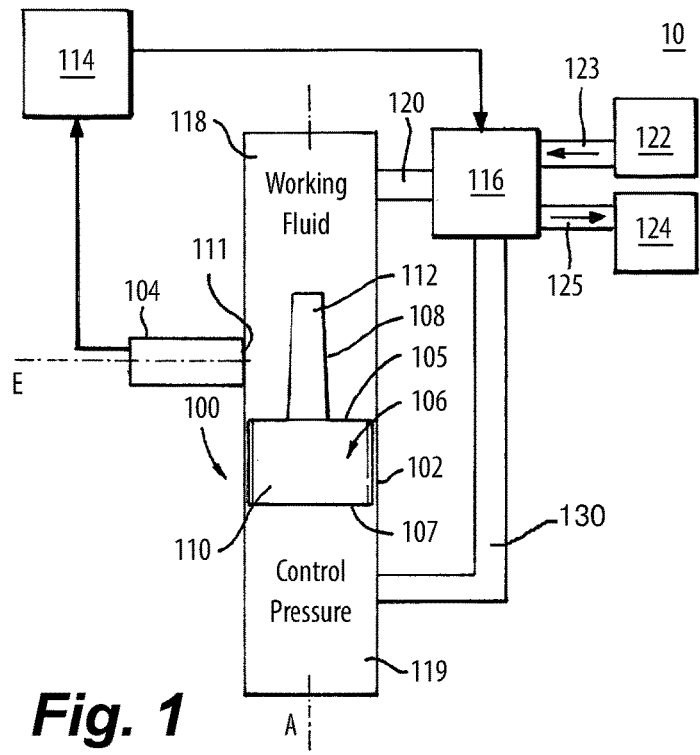
FIG. 1 is a schematic depiction of a fuel control system having a piston assembly constructed in accordance with an embodiment of the present disclosure, showing an inductive proximity probe sensor positioned on the housing with and the piston having a converging piston stem.

Reference will now be made to the drawings wherein like reference numerals identify similar structural features or aspects of the subject disclosure. For purposes of explanation and illustration, and not limitation, a schematic view of an exemplary embodiment of the piston assembly system in accordance with the disclosure is shown in FIG. 1 and is designated generally by reference character 100. Other embodiments of the piston assembly and methods in accordance with the disclosure, or aspects thereof, are provided in FIGS. 2A-4 as will be described. The systems and methods described herein can be used to provide smaller and more compact way to determine a linear and/or rotational position of a piston, e.g., a piston within a valve in a fuel control system.

As shown in FIG. 1, a fuel control system 10 includes a piston assembly 100 having a housing 102 and a proximity probe sensor 104 positioned on the housing 102. In some embodiments, the proximity probe sensor 104 is an inductive proximity probe sensor. In some embodiments, the proximity probe sensor 104 is a capacitive proximity probe sensor. An emitting/sensing end 111 of the proximity probe sensor 104 is within an outer diameter of housing 102, such that a wall of housing 102 is not blocking emitting/sensing end 111. Piston assembly 100 includes a piston 106 defining a longitudinal axis A positioned within housing 102. Piston 106 includes a piston base 110 and a piston stem 112. Piston 106 is made of a metallic material. Piston 106 includes a variable surface, e.g., a tapered surface 108. In the embodiment of FIG. 1, the variable surface is a tapered surface 108 on piston stem 112 that converges toward longitudinal axis A in a direction away from piston base 110. Those skilled in the art will readily appreciate that a variety of variable surfaces may be used, including variable surfaces with the same geometric profile, but with varying materials (e.g. a mix of magnetic and non-magnetic materials, similar to that shown in FIG. 4). It is also contemplated that the Proximity probe sensor 104 is positioned on housing 102 to detect a position of piston 106 with housing 102. By using proximity probe sensor 104, there are less space constraints than a traditional Linear Variable Differential Transformer (LVDT), which tends to take up more space. Proximity probe 104 also allows for easier interchangeability for easier tuning of assembly 100 for desired operational response.

As shown in FIG. 1, a servo valve 116 is in fluid communication with piston assembly 100 and electric/digital communication with an engine controller 114. Engine controller 114 is operatively connected to proximity probe sensor 104 to receive data therefrom. Piston assembly 100 includes a working fluid chamber 118 positioned between a first side 105 of piston base 110 and housing 102. Servo valve 116 is in fluid communication with working fluid chamber 118 via pressure fluid line 120. Assembly 100 includes a control pressure chamber 119 positioned between a second side 107 of piston base 110 and housing 102. Servo valve 116 is in fluid communication with control pressure chamber 119 via a control pressure line 130. Servo valve 116 is in fluid communication with a variety of input control pressures 122 via fluid conduit 123. Servo valve 116 is in fluid communication with a return, e.g. a drain tank 124, via a return conduit 125.

With continued reference to FIG. 1, proximity probe 104 is mounted orthogonally to longitudinal axis A of piston 106. Proximity probe 104 is configured and adapted to emit electromagnetic waves along an emission axis E. In the embodiment of FIG. 1, emission axis E is orthogonal to longitudinal axis A. Tapered surface 108 is a surface at an angle relative to a longitudinal axis A of piston 106 and relative to a longitudinal axis A of the overall housing 102 (which in the embodiment of FIG. 1 is the same as longitudinal axis A of piston 106). The variable surface, e.g., tapered surface 108, on piston 106 acts to return a different magnitude response to the electromagnetic field emitted from proximity sensor 104 as the piston 106 translates axially along longitudinal axis A due to the change in distance (taken in a direction perpendicular to longitudinal axis A) between proximity probe 104 and the tapered surface 108. As the distance changes, so does the magnitude of the response returned to the proximity probe. With that understanding, a given magnitude for a response can be correlated with a specific position along piston 106, and thereby the relative position of piston 106 within housing 102 can be determined.

As shown in FIG. 1, proximity probe 104 is in digital or other electrical communication with engine control 114 to provide feedback to engine control 114. Engine control 114 uses that feedback to determine piston 106 position within housing 102 and then uses algorithms to set a position of servo valve 116. Engine controller 114 is configured and adapted to use the input control pressures in the various algorithms used to set a position of servo valve 116. Engine controller 114 is configured and adapted to send a desired set position to servo valve 116, which in turn then adjusts the pressure through fluid line 120 into working fluid chamber 118. By adjusting the pressure in working fluid chamber 118, the pressure in control pressure chamber 119 is also adjusted. The pressure in control pressure chamber 119 can be used to control other valves throughout fuel control system 10.

Figure 2A:
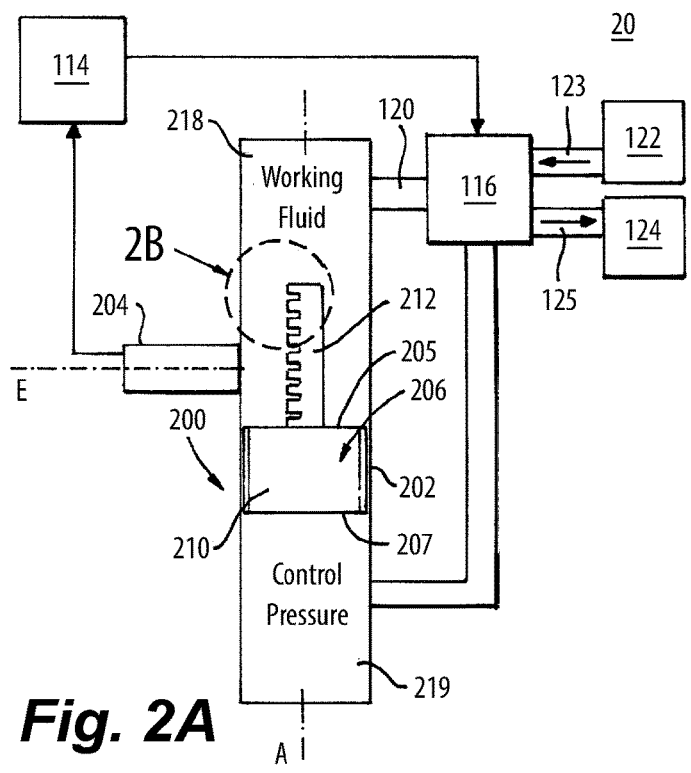
FIG. 2A is a schematic depiction of a fuel control system having a piston assembly constructed in accordance with another embodiment of the present disclosure, showing an inductive proximity probe sensor positioned on the housing and the piston having a notched piston stem.
Figure 2B:
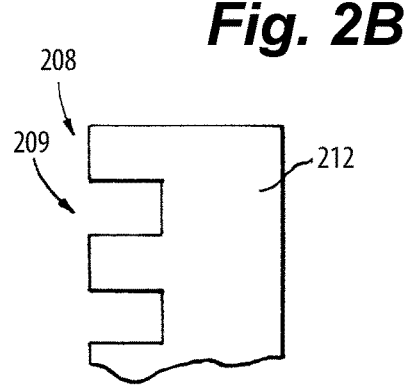
FIG. 2B is an enlarged schematic depiction the notched piston stem of the embodiment of the piston assembly of FIG. 2A, showing the notches.

With reference now to FIG. 2A-2B, another embodiment of a fuel control system 20 includes another embodiment of a piston assembly 200 with a housing 202 and a proximity probe sensor 204 positioned on housing 202. Proximity probe sensor 204 can be an inductive proximity probe sensor and/or a capacitive proximity probe sensor. Piston assembly 200 is the same as piston assembly 100 except that piston assembly 200 includes a piston 206 positioned within housing 202, where piston 206 includes a variable surface that is a notched surface 208. Piston 206 is made of a metallic material and is configured and adapted to translate axially along longitudinal axis A relative to housing 202. Notched surface 208 is formed in a stem 212 of piston 206 and includes a plurality of notches 209 formed in stem 212. Stem 212 extends from a first side 205 of a piston base 210. Piston assembly 200 includes a working fluid chamber 218, which is the same as chamber 118. Chamber 218 connects to servo valve 116 via fluid line 120. Piston base 210 includes a second side 207, opposite from first side 205. Assembly 200 includes a control pressure chamber 219, which is the same as chamber 119 in FIG. 1.

With continued reference to FIGS. 2A and 2B, proximity probe sensor 204 is positioned on housing 202 in a similar manner as probe sensor 104 and has similar space, size, and interchangeability advantages. Notches 209 are arranged linearly in an axial direction parallel to longitudinal axis A of piston 206. Instead of using the magnitude of the returned sensor signal on its own to determine a position of a piston, assembly 200 detects the position of piston 206 by counting the number of notches from a known position to determine an axial position of piston 206 within housing 202. The gain placed on proximity probe output signal centers the output signal around zero. Zero crossings are counted and compared to detect rate of change. Proximity probe sensor 204 senses where each variability occurs (due to the changing relative magnitudes of the return signals), produces a step response, which can then be counted to determine how many notches have been passed, thereby operating as a zero-cross detector. With the understanding that there is a known starting point, engine controller 114 can determine the position of piston 206 based the number of notches 209 that have been passed.

As shown in FIGS. 2A and 2B, engine control 114 then uses algorithms to set a position of servo valve 116, similar to system 10 of FIG. 1. Servo valve 116 of FIG. 2, is the same as servo valve 116 in FIG. 1. Input control pressures 122 are in fluid communication with servo valve 116 via conduit 123. Servo valve 116 is in fluid communication with a return, e.g. a drain tank 124, via a return conduit 125. In addition to the smaller packaging for a piston assembly that uses a proximity probe, by combining the proximity probe with a notched variable surface, the assembly 200 allows for zero crossing to potentially tune the response through all operating conditions independent of the magnitude of a linear signal. The notched signal can ease signal processing with zero crossings which is a common indicator for control theory. While the variable surface is described as a notched surface, a variety of suitable surface variations could be used. Engine controller 114 is configured and adapted to use the input control pressures in the various algorithms used to set a position of servo valve 116. Engine controller 114 is configured and adapted to send a desired set position to servo valve 116, which in turn then adjusts the pressure through fluid line 120 into working fluid chamber 218. By adjusting the pressure in working fluid chamber 218, the pressure in control pressure chamber 219 is also adjusted. The pressure in control pressure chamber 219 can be used to control other valves throughout fuel control system 20.

With reference now to FIG. 4, an alternative embodiment of piston 206 is shown. In this embodiment, piston 206 is the same as piston 206 of FIGS. 2A and 2B, except that notches 209 formed in the metallic stem 212 of piston 206 are filled in with a non-ferrous material 228. In this way, the variable surface of piston 206 is a multi-material surface, the multi-material surface including a first base material (making up the metal stem 212) with notches 209. In this way, piston 206 maintains the variability in the metallic material (first base material) that makes up stem 212 by way of the notches 209 that will return the different magnitude response to be sensed by proximity probe 204, but the outer diameter surface of the piston 206 is smooth for flow purposes. Those skilled in the art will readily appreciate that similar non-ferrous material 228 can be used to fill notches 309 of assembly 300, described below.

Figure 3:
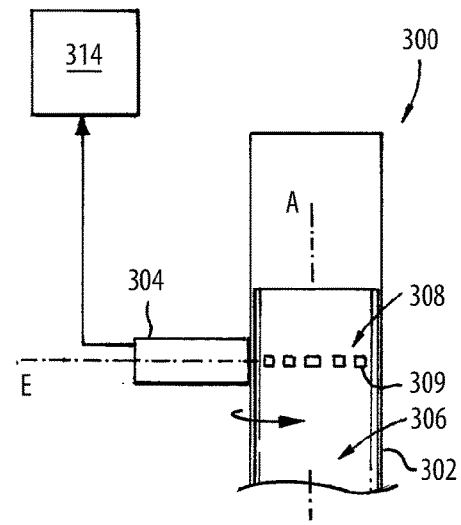
FIG. 3 is a schematic depiction of a fuel control system having a piston assembly constructed in accordance with another embodiment of the present disclosure, showing an inductive proximity probe sensor positioned on the housing and the piston having a notched piston stem.

As shown in FIG. 3, in some embodiments of a valve assembly 300, valve assembly 300 includes a cylindrical valve body 306 positioned within a housing 302, where valve body 306 includes a variable surface that is a notched surface 308 that extends in a circumferential direction around piston 306. Notched surface 308 is formed in a circumferential direction about longitudinal axis A of piston 306. Piston 306 is configured and adapted to rotate within housing 302 about longitudinal axis A (housing 302 is stationary relative to piston 306). The notched surface 308 includes a plurality of notches 309. Piston assembly 300 uses an proximity probe sensor 304 to determine the rotational position of piston 306 relative to housing 302. Proximity probe sensor 304 can be a capacitive proximity probe sensor and/or an inductive proximity probe sensor.

With continued reference to FIG. 3, inductive proximity probe sensor 304 defines an emission axis E and is positioned on the housing 302 in a similar manner as probe sensor 104 and has similar advantages to those described above. The relationship between the notches 309 and proximity probe sensor 304 is the same as that described above for notches 209 and proximity probe sensor 104, except that instead of counting the notches in a linear direction, proximity probe sensor 304 counts notches 309 as they pass in a circumferential direction (due to the variability of surface structure in the circumferential direction as piston 306 rotates). A control system 314 then uses algorithms in the same manner as described above for system 20 to set a position of servo valve, or the like. In addition to the smaller packaging for piston assembly 300 due to inductive proximity probe 304, by combining inductive proximity probe 304 with a notched variable surface 308, the assembly 300 allows for zero crossing to potentially tune the response through all operating conditions independent of the magnitude of a linear signal. The notched signal can ease signal processing with zero crossings which is a common indicator for control theory.

The methods and systems of the present disclosure, as described above and shown in the drawings, provide for piston assemblies methods and systems with superior properties including reduced weight and volume due to the use of an inductive proximity probe sensor. The systems and methods of the present invention can apply to linear and rotary movement of pistons in a variety of applications, such as fuel control systems, other valve or pump systems, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A piston assembly including:
   a housing;
   a piston positioned within the housing, wherein:
   the piston is configured to at least one of rotate or translate axially relative to the housing; and
   the piston includes a piston base and a variable surface, wherein the variable surface comprises:
   a first base metallic material having a plurality of notches; and
   a second non-ferrous material, wherein at least one of the plurality of notches is filled with the second non-ferrous material;
   a working fluid chamber positioned between a first side of the piston base and the housing in fluid communication with a servo valve;
   a control pressure chamber positioned between a second side of the piston base and the housing in fluid communication with the servo valve; and
   an inductive proximity probe sensor positioned on the housing configured to detect a current position of the piston within the housing by counting a subset of the plurality of notches between a previous known position and the current position of the piston.

2. The assembly as recited in claim 1, wherein the piston further includes a piston stem.

3. The assembly as recited in claim 1, wherein the variable surface is at least one of (i) a tapered surface on the piston stem, or (ii) a surface at an angle relative to a longitudinal axis of the piston.

4. The assembly as recited in claim 3, wherein the tapered surface converges away from the piston base.

5. The assembly as recited in claim 1, wherein the plurality of notches are at least one of (i) formed in an axial direction relative to the piston, or (ii) formed circumferentially about the piston.

6. The assembly as recited in claim 1, wherein the piston further includes a piston stem wherein the plurality of notches are formed on the piston stem.

7. A fuel control system comprising:
   a piston assembly including:
      a housing
      a piston positioned within the housing, wherein:
         the piston is configured to at least one of rotate or translate axially relative to the housing; and
         the piston includes a piston base and a variable surface, wherein the variable surface comprises:
            a first base metallic material having a plurality of notches; and
            a second non-ferrous material, wherein at least one of the plurality of notches is filled with the second non-ferrous material;
      a working fluid chamber positioned between a first side of the piston base and the housing;
      a control pressure chamber positioned between a second side of the piston base and the housing; and
      an inductive proximity probe sensor positioned on the housing configured to detect a current position of the piston within the housing by counting a subset of the plurality of notches between a previous known position and the current position of the piston;
   a servo valve in fluid communication with the working fluid chamber and the control pressure chamber of the piston assembly; and
   an engine controller operatively connected to the inductive proximity probe sensor, wherein the engine controller sets a position of the servo valve based on the current position of the piston detected by the inductive proximity probe.

8. The system as recited in claim 7, wherein the piston includes further a piston stem.

9. The system as recited in claim 8, wherein the variable surface is a tapered surface on the piston stem.

10. The system as recited in claim 9, wherein the tapered surface is a surface at an angle relative to a longitudinal axis of the piston.

11. The system as recited in claim 9, wherein the tapered surface converges away from the piston base.

12. The system as recited in claim 7, wherein the plurality of notches are formed in an axial direction relative to the piston.

13. The system as recited in claim 12, wherein the piston further includes a piston base and a piston stem wherein the plurality of notches are formed on the piston stem.

* * * * *